(12) United States Patent
Apichatachutapan et al.

(10) Patent No.: US 8,883,914 B2
(45) Date of Patent: Nov. 11, 2014

(54) ARTICLE FORMED FROM A RESIN COMPOSITION HAVING A POLYURETHANE ENCAPSULATED PARTICLE

(75) Inventors: Wassana Apichatachutapan, Woodhaven, MI (US); Donald C. Mente, Grosse Ile, MI (US); Suzanne Dakin, Grosse Pointe Farms, MI (US); Steven E. Wujcik, Ann Arbor, MI (US); Theodore M. Smiecinski, Woodhaven, MI (US)

(73) Assignee: BASF Corporation, Florham Park, NJ (US)

( * ) Notice: Subject to any disclaimer, the term of this patent is extended or adjusted under 35 U.S.C. 154(b) by 1456 days.

(21) Appl. No.: 11/276,067

(22) Filed: Feb. 13, 2006

(65) Prior Publication Data

US 2007/0191538 A1 Aug. 16, 2007

(51) Int. Cl.
*C08G 18/08* (2006.01)
*C08L 75/00* (2006.01)
*C08G 18/50* (2006.01)
*C08G 101/00* (2006.01)

(52) U.S. Cl.
CPC .... *C08G 18/5021* (2013.01); *C08G 2101/0083* (2013.01); *C08G 2101/0008* (2013.01)
USPC .................. 524/589; 252/2; 252/601; 523/1

(58) Field of Classification Search
USPC ............................. 524/589; 252/2, 601; 523/1
See application file for complete search history.

(56) References Cited

U.S. PATENT DOCUMENTS

| | | | |
|---|---|---|---|
| 3,259,482 A | 7/1966 | Hansen | |
| 3,264,089 A | 8/1966 | Hansen | |
| 3,475,154 A | 10/1969 | Kato | |
| 3,660,321 A * | 5/1972 | Praetzel | 521/59 |
| 3,717,597 A | 2/1973 | Hesskamp et al. | |
| 3,875,074 A | 4/1975 | Vassiliades et al. | |
| 3,891,572 A | 6/1975 | Moody et al. | |
| 4,138,356 A * | 2/1979 | Vincent et al. | 252/182.27 |
| 4,324,910 A | 4/1982 | Sandler et al. | |
| 4,385,131 A | 5/1983 | Fracalossi et al. | |
| 4,469,502 A | 9/1984 | Heller et al. | |
| 4,486,468 A | 12/1984 | Gray | |
| 4,612,239 A | 9/1986 | Dimanshteyn | |
| 4,681,806 A | 7/1987 | Matkan et al. | |
| 4,711,659 A | 12/1987 | Moore | |
| 4,772,490 A | 9/1988 | Kogler et al. | |
| 4,804,403 A | 2/1989 | Moore | |
| 4,943,649 A | 7/1990 | Magnus et al. | |
| 4,969,947 A | 11/1990 | Moore | |
| 4,977,052 A * | 12/1990 | Mikami | 430/123.5 |
| 5,082,757 A * | 1/1992 | Keoshkerian et al. | 430/110.2 |
| 5,087,384 A | 2/1992 | Horacek et al. | |
| 5,118,721 A | 6/1992 | Godoy et al. | |
| 5,153,233 A | 10/1992 | Godoy et al. | |
| 5,211,985 A * | 5/1993 | Shirley et al. | 427/213 |
| 5,374,292 A | 12/1994 | Detrick et al. | |
| 5,538,531 A * | 7/1996 | Hudson et al. | 71/28 |
| 5,547,486 A | 8/1996 | Detrick et al. | |
| 5,628,813 A * | 5/1997 | Chen et al. | 71/64.02 |
| 5,730,909 A * | 3/1998 | Smiecinski et al. | 252/609 |
| 5,803,946 A | 9/1998 | Petcavich et al. | |
| 5,830,926 A * | 11/1998 | Smiecinski et al. | 521/128 |
| 5,851,261 A | 12/1998 | Markusch et al. | |
| 5,925,687 A * | 7/1999 | Guettes et al. | 521/137 |
| RE36,358 E * | 10/1999 | Grinbergs et al. | 521/128 |
| 6,100,308 A | 8/2000 | Guettes et al. | |
| 6,133,398 A * | 10/2000 | Bhat et al. | 528/60 |
| 6,176,891 B1 | 1/2001 | Komoriya et al. | |
| 6,231,633 B1 | 5/2001 | Hirano et al. | |
| 6,358,296 B1 | 3/2002 | Markusch et al. | |
| 6,364,925 B1 * | 4/2002 | Markusch et al. | 71/64.07 |
| 6,410,801 B1 * | 6/2002 | Hinz et al. | 568/606 |
| 6,663,686 B1 * | 12/2003 | Geiger et al. | 71/28 |
| 6,777,524 B1 * | 8/2004 | Shimizu et al. | 528/76 |

(Continued)

FOREIGN PATENT DOCUMENTS

| | | | | |
|---|---|---|---|---|
| CA | 2149075 | | 11/1996 | |
| CA | 2272480 | | 11/1999 | |
| EP | 0 867 422 A2 | | 9/1998 | |
| GB | 934121 | * | 8/1963 | |
| RU | 2240848 C1 | * | 11/2004 | A62D 1/00 |
| WO | WO 98/29360 | | 7/1998 | |
| WO | WO 02/00573 A2 | | 1/2002 | |

OTHER PUBLICATIONS

ChemEurope urea data sheets (ChemEurope.com pp. 1-6 (C) 1997) {ChemEurope.com/encyclopedia/Urea.html }.*
Ballisteri et al. (Makromol. Chem. vol. 181 pp. 2161-2173 1980).*
Forrest (Chemical Characterization of Polyurethanes 2001 © Rapra Technology LTD Shawbury, Shrewsbury, Shropshire UK p. 3).*
CF Industries (Diammonium Phosphate Materials Safety Data Sheet Jul. 1, 2003 { http://www.dld-delitzsch.de/dokumente/DAP%2018-46.pdf}).*

(Continued)

*Primary Examiner* — Patrick Ryan
*Assistant Examiner* — Aaron Greso
(74) *Attorney, Agent, or Firm* — Howard & Howard Attorneys PLLC

(57) ABSTRACT

A resin composition includes a compound having at least two reactive hydrogen atoms and a polyurethane encapsulated particle including a core particle and a polyurethane layer disposed about the core particle. The resin composition may be used in an article and in a method of making the article. The article includes the reaction product of the resin composition and an isocyanate that are reacted in the presence of the polyurethane encapsulated particle. The method of making the article includes providing the core particle in a vessel. The method also includes introducing and combining a polyol component and an isocyanate component to encapsulate the core particle. The method further includes introducing and combining the resin composition and the isocyanate, in the presence of the polyurethane encapsulated particle, to form the article.

38 Claims, No Drawings

(56) References Cited

U.S. PATENT DOCUMENTS

| | | | |
|---|---|---|---|
| 2003/0033843 A1 | 2/2003 | Tabei | |
| 2003/0040435 A1* | 2/2003 | Haberle et al. | 504/101 |
| 2004/0016276 A1 | 1/2004 | Wynnyk et al. | |
| 2004/0020254 A1 | 2/2004 | Wynnyk et al. | |
| 2004/0045331 A1 | 3/2004 | Geiger et al. | |
| 2004/0051191 A1* | 3/2004 | Loh et al. | 264/4 |
| 2004/0259987 A1* | 12/2004 | Zubkova et al. | 524/136 |
| 2005/0266245 A1 | 12/2005 | Mente | |

OTHER PUBLICATIONS

Building Science Corporation, Joseph Lstiburek {Insulations, Sheathings and Vapor Retarders Research Report—0412 Nov. 2004; Builders Guide for Cold Climates 2004.*

Urea MSDS (Science Lab created Oct. 10, 2005; density property taken as applicable to creation date {http://www.sciencelab.com/msds.php?msdsld=9927317}).*

Cyclops (Properties Table, polyurethane entry, crawl post date Jan. 2004 {http://www.psyclops.com/tools/technotes/materials/density.html}; Crawl post activity date taken as Jan. 1, 2004).*

Minimize Real Dictionary dot Com available May 23, 2003 {http://www.realdictionary.com/?q=minimize}.*

Viswanathan, Tito; Burrington, D.; Tichardson, T.; "Preparation of Rigid, Low-density, Flame-retardant Polyurethane Foams from Whey Permeate"; J. Chem Tech. Biotechnol.; 1984; pp. 52-56; vol. 34B; Department of Food Science, University of Wisconsin-Madison, Madison, Wisconsin 53706, USA.

Rawle, "Basic Principles of Particle Size Analysis", Malvern Instruments, Worcestershire, UK, 8 pages.

* cited by examiner

ARTICLE FORMED FROM A RESIN COMPOSITION HAVING A POLYURETHANE ENCAPSULATED PARTICLE

FIELD OF THE INVENTION

The present invention generally relates to a resin composition and an article each having a polyurethane encapsulated particle. The present invention also generally relates to a method of making an article. The polyurethane encapsulated particle, more specifically, includes a polyurethane layer disposed about a core particle that is used as a flame retardant in the resin composition and the article.

DESCRIPTION OF THE RELATED ART

Various resin compositions have been investigated for use in industrial processes as precursors to formation of a wide variety of foams. Typical foams include polyurethane and polyurea foams. The polyurethane and polyurea foams are usually formed by reaction of a polyol or polyamine and an isocyanate. A blowing agent is usually added to the reaction to form gas bubbles that become trapped in the foam. The gas bubbles form voids in the foam and increase a volume of the foam.

Polyurethane and polyurea foams can be rigid, semi-rigid, or flexible foams and can be used in a wide variety of applications. Flexible foams can be utilized in many applications including furniture, bedding, automobile seat and automobile trim applications such as head and arm rests. Semi-rigid foams can be utilized in packing and shipping materials and can be used as coatings, adhesives, and sealants. Rigid foams can be utilized in applications including insulation and as a strengthening material for a composite article.

Various resin compositions have also been investigated as precursors to formation of a wide variety of elastomers. Typical elastomers include polyurethane and polyurea elastomers. The elastomers, like the foams, are also usually formed by a reaction of a polyol or polyamine and an isocyanate. However, the blowing agent that is used in the formation of foam is not added to the reaction to form the elastomers. Without addition of the blowing agent, gas bubbles do not form in the elastomer and the volume of the elastomer is not increased.

Polyurethane and polyurea elastomers have less volume than typical polyurethane and polyurea foams and may be used to form automotive parts such as instrument panels, door bolsters, and various other interior trim components. The elastomers may also be used in industrial applications as coatings, adhesives, sealants, and in reaction injection molded plastics.

In most applications, both the polyurethane and polyurea foams and elastomers are combustible, flammable, and present potential safety hazards. The foams and elastomers may burn at a high rate and may have long lasting after-flames which present potential safety hazards. Accordingly, efforts have been made to reduce combustibility and flammability.

One effort made to reduce combustibility and flammability includes incorporation of flame retardants, such as halogens, into the foams and the elastomers. However, halogens are expensive and present potential environmental hazards. A decrease in use of halogens is desirable.

Another effort made to reduce combustibility is disclosed in U.S. Pat. No. 3,717,597 to Hesskamp et al. The '597 patent discloses addition of powdered urea to a binder which is added to particles of a pre-formed polyurethane foam. Urea is a known flame retardant that decreases combustibility and flammability of a foam. The particles of the pre-formed polyurethane foam are held together with the binder and compressed to form a final composite material that includes the urea. Although the '597 patent discloses addition of powdered urea to the binder and using the binder to hold together the particles of pre-formed polyurethane foam, the '597 patent does not disclose reacting an isocyanate and a resin composition in the presence of urea thus encapsulating the urea. The '597 patent is deficient because the powdered urea may release ammonia during foaming which catalyzes a reaction of water and the isocyanate, thereby producing friable foam that is not suitable for many applications.

In a similar effort, U.S. Pat. No. 5,118,721 to Godoy et al. discloses formation of a polyol basestock from which a dispersion polyol is prepared. Particles of urea, used as a filler, along with a polymer including amines, epoxides, and oxamates, are added to the polyol basestock to form the dispersion polyol. The dispersion polyol including the urea can be used to form polyurethane foams. The '721 patent does not, however, disclose a polyurethane encapsulated urea or reacting an isocyanate and a resin composition in the presence of the polyurethane encapsulated urea. The '721 patent is deficient because the urea, although added to the polyol basestock, is not encapsulated and may catalyze the reaction of water and the isocyanate, thereby producing friable foam that is not suitable for many applications.

As such, there remains an opportunity to utilize a polyurethane encapsulated particle in a resin composition that includes a compound having at least two reactive hydrogen atoms. There also remains an opportunity to reduce the use of halogens in foams and elastomers and to cost effectively form a flame retardant article that includes the polyurethane encapsulated particle.

SUMMARY OF THE INVENTION AND ADVANTAGES

The present invention provides a resin composition. The resin composition includes a compound having at least two reactive hydrogen atoms. The resin composition also includes a polyurethane encapsulated particle that includes a core particle and a polyurethane layer disposed about the core particle.

The present invention also provides an article. The article includes the reaction product of the resin composition including the compound, and an isocyanate. The resin composition and the isocyanate are reacted in the presence of the polyurethane encapsulated particle.

The present invention further provides a method of making an article. The method includes the step of providing the core particle in a vessel. The method also includes the step of introducing a polyol component and the step of introducing an isocyanate component. The method further includes the step of combining the polyol component and the isocyanate component to encapsulate the core particle. The method still further includes the step of combining the isocyanate and the resin composition that includes the compound described above, in the presence of the polyurethane encapsulated particle, to form the article.

The polyurethane layer disposed about the core particle serves a protective function by allowing the core particle to be added to the resin composition and/or article of the present invention while minimizing a potential that the core particle will catalyze a reaction between water and the isocyanate component producing friable foam. A decrease in potential catalysis allows the core particle to be discretely present and to function efficiently in the resin composition and/or the article as a flame retardant and/or filler.

The polyurethane layer disposed about the core particle also allows the core particle to be effectively dispersed in the resin composition and/or article of the present invention while reducing potential dissolution from contact with the compound in the resin composition. Improved dispersion and a reduction of dissolution of the core particle allow the core particle to be uniformly present in the resin composition and/or article and allow the core particle to provide effective flame retardancy.

DETAILED DESCRIPTION OF A PREFERRED EMBODIMENT

A resin composition is disclosed. The resin composition includes a compound having at least two reactive hydrogen atoms and a polyurethane encapsulated particle. The polyurethane encapsulated particle will be described in greater detail below. The compound is preferably selected from the group of a polyol, an amine, and combinations thereof. More preferably, the compound is selected from the group of polyether polyols, polyester polyols, polycarbonate polyols, and combinations thereof. It is also contemplated that, for purposes of the present invention, polythioether polyols, polycaprolactones, and acrylic polyols may also be utilized. Even more preferably, the compound is selected from the group of polyether polyols, polyester polyols, and combinations thereof. Most preferably, the compound is a polyether polyol and is commercially available from BASF Corporation of Wyandotte, Mich., under the trade names of Pluracol® 1385, 1388, 2100, 4600, and 4800. However, any polyol known in the art may be used in the present invention so long as the polyol has at least two reactive hydrogen atoms.

If the compound includes the polyol, the polyol may be derived from a reaction of an initiator and an alkylene oxide. The initiator may include any initiator known in the art. Preferably, the initiator is selected from the group of ethylene glycol, propylene glycol, dipropylene glycol, trimethylene glycol, butane diols, pentane diols, hexane diols, heptane diols, glycerol, 1,1,1-trimethylolpropane, 1,1,1-trimethylolethane, hexane triols, alkyl glucosides, pentaerythritol, sorbitol, diamine naphthalenes, anilines, condensation products of aniline and formaldehyde, alkyl amines, triisopropanolamine, alkylene diamines, diamine alkanes, and combinations thereof. More preferably, the initiator is selected from the group of glycerol, 1,1,1-trimethylolpropane, 1,1,1-trimethylolethane, hexane triols, and combinations thereof. Most preferably, the initiator is selected from the group of glycerol, 1,1,1-trimethylolpropane, and combinations thereof.

Preferably, the alkylene oxide that reacts with the initiator to form the polyol is selected from the group of ethylene oxide, propylene oxide, butylene oxide, amylene oxide, tetrahydrofuran, alkylene oxide-tetrahydrofuran mixtures, epihalohydrins, aralkylene oxides, and combinations thereof. More preferably, the alkylene oxide is selected from the group of ethylene oxide, propylene oxide, and combinations thereof. Most preferably, the alkylene oxide includes propylene oxide. However, it is also contemplated that any suitable alkylene oxide that is known in the art may be used in the present invention.

The polyol may include an organic functional group selected from the group of a carboxyl group, an amine group, a carbamate group, an amide group, and an epoxy group. The polyol may also include an alkylene oxide cap. If the polyol includes the alkylene oxide cap, the alkylene oxide cap preferably includes, but is not limited to, ethylene oxide, propylene oxide, butylene oxide, amylene oxide, and combinations thereof. More preferably, the alkylene oxide cap includes ethylene oxide. If the polyol includes the alkylene oxide cap, the alkylene oxide cap is preferably less than or equal to 25, more preferably of from 10 to 20, and most preferably of from 12 to 18, percent by weight based on the total weight of the polyol.

The polyol also preferably has a number average molecular weight of from 200 to 10,000 g/mol. More preferably, the polyol has a number average molecular weight of from 500 to 8,000, and most preferably of from 500 to 5,000, g/mol. The polyol also preferably has a hydroxyl number of from 10 to 1,000 mg KOH/g. More preferably, the polyol has a hydroxyl number of from 20 to 200, and most preferably of from 30 to 200, mg KOH/g.

The polyol also preferably has a nominal functionality of from 1 to 8. More preferably, the polyol has a nominal functionality of from 1.5 to 6, and most preferably of from 2 to 4. Further, the polyol also preferably has a viscosity from 20 to 50,000, more preferably from 300 to 20,000, even more preferably from 500 to 10,000, and most preferably from 500 to 1,500, centipoise at 77° F.

The polyol may additionally include an addition polymer dispersed within the polyol. More specifically, the polyol may include a dispersion or a solution of addition or condensation polymers, i.e., a graft polyol. The dispersion may include styrene, acrylonitrile, and combinations thereof. Also, the polyol may also include an emulsion that includes water or any other polar compound known in the art. In all embodiments of the present invention, it is contemplated that any polyol known in the art may be utilized.

If the compound does not include a polyol, then the compound may include the amine, as first described above. If the compound includes the amine, the amine may be any type known in the art. The amine preferably includes, but is not limited to, primary and secondary amines aliphatic and/or cyclic aliphatic amines. The amine may include any additional functional group known in the art including, but not limited to, hydroxyl groups, thiol groups, alkyl groups, cyclic groups, aromatic groups, and combinations thereof. It is to be understood that the amine may also include an amide. If the amine includes the amide, the amide may be any type known in the art. Preferably the amide includes, but is not limited to, polyester amides obtained from polymers of unsaturated or saturated carboxylic acids or anhydrides, and multifunctional unsaturated or saturated amino-alcohols, and combinations thereof. In all embodiments of the present invention, it is contemplated that any amine or amide known in the art may be utilized.

The compound is preferably present in the resin composition in an amount of from 1 to 95 parts by weight per 100 parts by weight of the resin composition. More preferably, the compound is present in the resin composition in an amount of from 50 to 95, and most preferably of from 60 to 95 parts by weight per 100 parts by weight of the resin composition.

Referring now to the polyurethane encapsulated particle first introduced above, the encapsulated particle includes a core particle and a polyurethane layer disposed about the core particle. The core particle preferably includes a flame retardant. More preferably, the core particle includes the general structure:

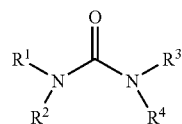

wherein each of $R^1$ through $R^4$ preferably and independently includes one of an aliphatic group, an aromatic group, and a hydrogen. However, it is contemplated that any functional group may be included for each of $R^1$ through $R^4$. Most preferably, the core particle includes urea and includes the general structure:

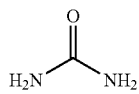

Urea is inexpensive and produced on a large scale. The urea functions efficiently as a flame retardant by absorbing heat and subliming to quench combustion. The urea also acts as an inexpensive filler used to increase volume of the resin composition. Use of the urea reduces an amount of halogens needed to provide flame retardancy and decreases potential environmental hazards and production costs.

Although the core particle may be of any size, the core particle preferably has a diameter of from 1 to 500, and most preferably of from 1 to 300, microns. Core particles with smaller diameters allow less of the polyurethane layer to be used, allow the polyurethane layer to be applied to the core particle at a lower viscosity, and allow the polyurethane layer to be disposed about the core particle with increased uniformity and completeness. The core particle may also be of any shape. Preferably the core particle is either ground or spheroidized.

The core particle also preferably has a temperature of decomposition of from 50 to 600, more preferably of from 70 to 400, and most preferably of from 70 to 300° C. If the core particle includes urea, the temperature of decomposition of the urea is the temperature at which the urea sublimes and quenches combustion, leading to effective flame retardancy.

Referring now to the polyurethane layer disposed about the core particle, the polyurethane layer disposed about the core particle may include the reaction product of an isocyanate component and a polyol component. The isocyanate component may be any known in the art including, but not limited to, aromatic isocyanate components, aliphatic isocyanate components, blocked isocyanate components, modified isocyanate components, and prepolymer isocyanate components. However, the isocyanate component that reacts with the polyol component to form the polyurethane layer preferably includes an aromatic isocyanate component, an aliphatic isocyanate component, and combinations thereof. Most preferably, the isocyanate component includes an aromatic isocyanate component. If the isocyanate component includes an aromatic isocyanate component, the aromatic isocyanate component preferably corresponds to the formula $R'(NCO)_z$ wherein R' is a polyvalent organic radical which is aromatic and z is an integer that corresponds to the valence of R'. Preferably, z is at least two. The isocyanate component of the present invention is preferably aromatic because the aromaticity imparts increased reactivity towards the reaction of the isocyanate component with the polyol component, and a reduced cost associated with manufacture of the isocyanate component.

Most preferably, the aromatic isocyanate component is selected from the group of methylene diphenyl diisocyanate, toluene diisocyanate, and combinations thereof. However, the isocyanate component may include, but is not limited to, 1,4-diisocyanatobenzene, 1,3-diisocyanato-o-xylene, 1,3-diisocyanato-p-xylene, 1,3-diisocyanato-m-xylene, 2,4-diisocyanato-1-chlorobenzene, 2,4-diisocyanato-1-nitro-benzene, 2,5-diisochyanato-1-nitrobenzene, m-phenylene diisocyanate, p-phenylene diisocyanate, 2,4-toluene diisocyanate, 2,6-toluene diisocyanate, mixtures of 2,4- and 2,6- toluene diisocyanate, 1,5-naphthalene diisocyanate, 1-methoxy-2,4-phenylen diisocyanate, 4,4'-diphenylmethane diisocyanate, 2,4'-diphenylmethane diisocyanate, 4,4'-biphenylene diisocyanate, 3,3'-dimethyl-4,4'-diphenylmethane diisocyanate, and 3,3'-dimethyldiphenylmethane-4,4'-diisocyanate, triisocyanates such as 4,4',4"-triphenylmethane triisocyanate polymethylene polyphenylene polyisocyanate and 2,4,6-toluene triisocyanate, tetraisocyanates such as 4,4'-dimethyl-2,2'-5,5'-diphenylmethane tetraisocyanate, toluene diisocyanate, 2,2'-diphenylmethane diisocyanate, 2,4'-diphenylmethane diisocyanate, 4,4'-diphenylmethane diisocyanate, polymethylene polyphenylene polyisocyanate, corresponding isomeric mixtures thereof, and combinations thereof.

The isocyanate component may also include a modified multivalent aromatic isocyanate component, i.e., a product which is obtained through chemical reactions of aromatic diisocyanate components and/or aromatic polyisocyanate components. Examples include polyisocyanate components including, but not limited to, ureas, biurets, allophanates, carbodiimides, uretonimines, and isocyanurate and/or urethane groups including diisocyanate components and/or polyisocyanate components such as modified diphenylmethane diisocyanate components. The isocyanate component may also include, but is not limited to, modified benzene and toluene diisocyanate components, employed individually or in reaction products with polyoxyalkyleneglycols, diethylene glycols, dipropylene glycols, polyoxyethylene glycols, polyoxypropylene glycols, polyoxypropylenepolyoxethylene glycols, polyesterols, polycaprolactones, and combinations thereof. The isocyanate component may also include stoichiometric or non-stoichiometric reaction products of the aforementioned isocyanate components. Preferred examples of the isocyanate component are commercially available from BASF Corporation of Wyandotte, Mich., under the trade names of Lupranate® MP102 and Elastoflex® R23000T. Preferably, the polyol component and the isocyanate component are reacted at an isocyanate index of from 80 to 130, more preferably of from 90 to 120, and most preferably of from 95 to 110.

Referring now to the polyol component first introduced above, the polyol component may include any polyol known in the art. Specifically, the polyol component may include polyether polyols, polyester polyols, and combinations thereof. If the isocyanate component is aromatic, the polyol component may be derived from an aromatic amine-based initiator. The polyol component derived from an aromatic amine-based initiator is described in further detail below. If the isocyanate component is not aromatic, the polyol component may still be derived from the aromatic amine-based initiator. The aromatic amine-based initiator provides a polyol component that is completely miscible with the isocyanate component that is aromatic. The complete miscibility of the isocyanate component that is aromatic and the polyol component that is derived from the aromatic amine-based initiator is the result of two primary effects. First, the complete miscibility is due to London Forces that create momentarily induced dipoles between similar aromatic moieties of the polyol component and the isocyanate component. The momentarily induced dipoles allow the isocyanate component and the polyol component to mix effectively. Secondly, the complete miscibility is due to the planar geometry of the aromatic moieties of the polyol component and the isocyanate component that allow for complementary stacking of the polyol component and isocyanate component. The complementary stacking of the aromatic moieties also allows the isocyanate component and the polyol component to mix effectively.

The complete miscibility of the isocyanate component that is aromatic and the polyol component derived from the aromatic amine-based initiator yields multiple advantages. The complete miscibility results in an ability to use various techniques for applying the polyol component and the isocyanate component to the core particle, as will also be described in greater detail below.

Most preferably, the aromatic amine-based initiator includes the general structure:

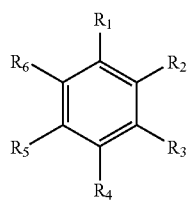

wherein $R_1$ includes one of an alkyl group, an amine group, and a hydrogen and each of $R_2$-$R_6$ independently include one of an amine group and a hydrogen, so long as at least one of $R_1$-$R_6$ is an amine group. Therefore, it is to be understood that $R_1$ can be any one of an alkyl group, an amine group, or a hydrogen, or any compound including combinations thereof. It is also to be understood that $R_2$-$R_6$ do not have to be identical and each can include an amine group or a hydrogen. It is also to be understood that the terminology "an amine group" refers to R—N—H and $NH_2$. Most preferably, the aromatic amine-based initiator includes a toluene diamine including the general structures:

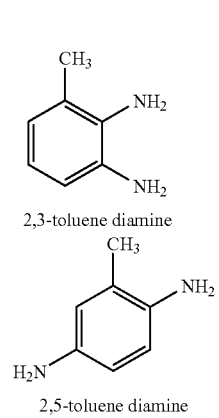
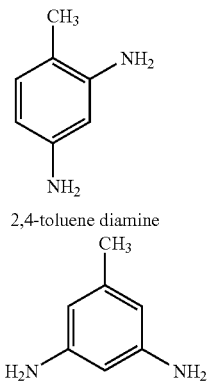
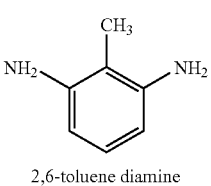
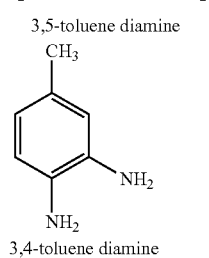

wherein the toluene diamine includes, but is not limited to, 2,3-toluenediamine, 2,4-toluenediamine, 2,5-toluenediamine, 2,6-toluenediamine, 3,4-toluenediamine, 3,5-toluenediamine, and combinations thereof. If the polyol is derived from the aromatic amine-based initiator, the polyol is shelf-stable thereby allowing for more effective storage and subsequent usage. Most preferably, the polyol derived from the aromatic amine-based initiator is commercially available from BASF Corporation of Wyandotte, Mich. under the trade name of Pluracol® Polyol 824.

If the polyol component is not derived from the aromatic amine-based initiator, the polyol component may include a polytetrahydrofuran commercially available from BASF Corporation of Wyandotte, Mich., under the trade name of PolyTHF®. Specific preferred polytetrahydrofurans include PolyTHF® 650, PolyTHF® 1000, PolyTHF® 1000S, PolyTHF® 1400, PolyTHF® 1800, PolyTHF® 2000, and combinations thereof. Alternatively, the polyol component may include a polyol initiated from ethylene diamine, glycerin, or 1,1,1-trimethyolpropane. The polyol initiated from the ethylene diamine is commercially available from BASF Corporation of Wyandotte, Mich., under the trade name of Pluracol 355®. The polyol initiated from the glycerin is commercially available from BASF Corporation of Wyandotte, Mich., under the trade names of Pluracol® GP730 and Pluracol® 593. The polyol initiated from the 1,1,1-trimethylolpropane is commercially available from BASF Corporation of Wyandotte, Mich., under the trade name of Pluracol® GP1158.

Preferably, the polyurethane layer has a temperature of decomposition of from 100 to 400, more preferably of from 150 to 350, and most preferably of from 200 to 300° C. The temperature of decomposition is the temperature at which the core particle sublimes and forms an inert blanket thereby increasing flame retardancy. In one embodiment, the temperature of decomposition is higher than a temperature at which an article is formed, as described in greater detail below.

Preferably, when the polyurethane layer is being formed and disposed about the core particle, the polyol component is preferably present in an amount of from 1 to 50, more preferably from 1 to 30, and most preferably of from 15 to 30, parts by weight per 100 parts by weight of the core particle, the polyol component, and the isocyanate component. However, the polyol component may be present in any amount. Also, when the polyurethane layer is being formed, the core particle is preferably present in an amount of from 30 to 99, more preferably of from 70 to 99, and most preferably of from 70 to 85, parts by weight per 100 parts by weight of the core particle, the polyol component, and the isocyanate component. However, the core particle may be present in any amount. Further, when the polyurethane layer is being formed, the isocyanate component is preferably present in a ratio of 1:1.15, more preferably of 1:1.10, and most preferably in a ratio of 1:05, parts of the polyol component to parts of the isocyanate component.

The polyurethane encapsulated particle is preferably present in the resin composition in an amount of from 1 to 70 parts by weight per 100 parts by weight of the resin composition. More preferably, the polyurethane encapsulated particle is present in the resin composition in an amount of from 5 to 50 and most preferably of from 15 to 40, parts by weight per 100 parts by weight of the resin composition.

The resin composition may also include a supplemental flame retardant additive. The supplemental flame retardant additive may be included in the resin composition to provide increased flame retardancy in various applications. In commercial application, those skilled in the art may select whether to include the supplemental flame retardant additive to the resin composition. It is also to be understood that the resin composition may include a plurality of supplemental flame retardant additives. If included in the resin composition, the supplemental flame retardant additive is preferably included in an amount of from 1 to 30 parts, more preferably of from 3 to 25, and most preferably of from 3 to 20, parts by weight per 100 parts by weight of the resin composition.

Preferably, the supplemental flame retardant additive is selected from the group of phosphorous, halogens, and combinations thereof. If included, the supplemental flame retardant additive is more preferably selected from the group of phosphorous, bromine, and combinations thereof. Examples of suitable supplemental flame retardant additives include, but are not limited to, red phosphorus, ammonium polyphosphate, tris(2-chloroethyl) phosphate, tris(2-chloropropyl) phosphate, tetrakis(2-chloroethyl)ethylene diphosphate, dimethyl methane phosphonate, diethyl diethanolaminomethylphosphonate, and combinations thereof. Most preferably, the resin composition includes the supplemental flame retardant that is commercially available from Great Lakes Chemical Corporation of Indianapolis, Ind., under the trade name of Firemaster® 550, and the supplemental flame retardant additives that are commercially available from Albemarle Corporation of Richmond, Va., under the trade names of Antiblaze® 100, 205, and 230. Additionally, other supplemental flame retardants are also contemplated for use in the present invention including, but not limited to, hydrated aluminum oxide, calcium sulfate, expanded graphite, cyanuric acid derivatives, and combinations thereof.

The resin composition may also include an additive selected from the group of silicones, amines, polymerization catalysts, gelling catalysts, blowing agents, surfactants, cross-linkers, inert diluents, chain extenders, anti-foaming agents, chain terminators, and combinations thereof. The resin composition may also include a plurality of the additives. If the resin composition includes the polymerization catalyst as the additive, the polymerization catalyst catalyzes the reaction of the compound and the isocyanate component. Although any polymerization catalyst known in the art may be used in the resin composition, the polymerization catalyst preferably includes but is not limited to, tin, iron, lead, bismuth, mercury, titanium, hafnium, zirconium, and combinations thereof. Suitable polymerization catalysts include iron (II) chloride, zinc chloride, and lead octoate. Even more preferably, the polymerization catalyst includes stabilized stannous octoate and is commercially available from Air Products and Chemicals, Inc. of Allentown, Pa., under the trade name of DABCO T10. However, other suitable tin catalysts that may be used include tin(II) salts of organic carboxylic acids, eg. tin(II) acetate, tin(II) octoate, tin(II) ethylhexanoate and tin(II) laurate, and dialkyltin(IV) salts of organic carboxylic acids, e.g., dibutyltin dilaurate, dibutyltin diacetate, dibutyltin maleate and dioctyltin diacetate. If included, the polymerization catalyst is preferably included in an amount of from 0.01 to 1, and more preferably of from 0.3 to 0.6, parts by weight per 100 parts by weight of the resin composition.

Additionally, any of the aforementioned polymerization catalysts may be combined with amines including, but not limited to, amidines such as 2,3-dimethyl-3,4,5,6-tetrahydropyrimidine, tertiary amines such as triethylamine, tributylamine, dimethylbenzylamine, N-methylmorpholine, S-ethylmorpholine, N-cyclohexylmorpholine, N,N,N',N'-tetramethylethylenediamine, N,N,N',N'-tetramethylbutanediamine, N,N,N',N'-tetramethylhexane-1,6-diamine, pentamethyldiethylenetriamine, bis(dimethylaminoethyl) ether, bis(dimethylaminopropyl)urea dimethylpiperazine, 1,2-dimethylimidazole, 1-azabicyclo[3.3.0]octane and preferably 1,4-diazabicyclo[2.2.2]octane, and alkanolamine compounds such as triethanolarnine, triisopropanolamine, N-methyldiethanolamine and N-ethyldiethanolamine and dimethylethanolamine.

Further, other suitable polymerization catalysts that are contemplated for use in the present invention as the additive include, but are not limited to, tris(dialkylaminoalkyl)-s-hexahydrotriazines, including tris(N,N-dimethylaminopropyl)-s-hexahydrotriazine, tetraalkylammonium hydroxides including tetramethylammonium hydroxide, alkali metal hydroxides including sodium hydroxide and potassium hydroxide, alkali metal alkoxides including sodium methoxide and potassium isopropoxide, and alkali metal salts of long-chain fatty acids having from 10 to 20 carbon atoms and/or lateral OH groups. A particular polymerization catalyst or combination of polymerization catalysts may be chosen by one skilled in the art.

If the resin composition includes the gelling catalyst as the additive, the gelling catalyst, like the polymerization catalyst, promotes a reaction between the compound and the isocyanate component. The gelling catalyst preferably includes, but is not limited to, amines. More preferably, the gelling catalyst includes tertiary amines such as DABCO amine catalysts. Most preferably, the gelling catalyst includes DABCO amine catalysts such as Dabco 33 LV amine catalyst which includes a combination of triethylene diamine and dipropylene glycol. If included in the resin composition, the gelling catalyst may be present in any amount. However, the gelling catalyst is preferably included in an amount of from 0.01 to 1 and more preferably of from 0.05 to 0.5, parts by weight per 100 parts by weight of the resin composition.

The resin composition may also include the blowing agent as the additive, if polyurethane foams are desired. The blowing agent may include, but is not limited methylene chloride, acetone, and liquid carbon dioxide, aliphatic and/or cycloaliphatic hydrocarbons such as halogenated hydrocarbons and alkanes, acetals, water, alcohols, and glycerol, and combinations thereof. More preferably, the blowing agent includes water, alcohols, and combinations thereof. Most preferably, the blowing agent includes water. If included in the resin composition, the blowing agent may be included in any amount. However, the blowing agent is preferably included in an amount of less than or equal to 30, more preferably of from 1 to 15, and most preferably of from 2 to 10, parts by weight per 100 parts by weight of the resin composition.

If the resin composition includes the silicone as the additive, the silicone is preferably a silicone surfactant and serves to control cell size and shape of the flexible foam produced from the reaction of the polyol and the isocyanate component. The silicone surfactant preferably includes, but is not limited to, bulk and surface silicone surfactants and combinations thereof. The silicone surfactant is commercially available from GE Silicones of Wilton, Conn., and most preferably includes silicone surfactants including, but not limited to, Niax® L-620, L-630, L-631, L-632, L-635, and L-650. If included in the resin composition, the silicone may be present in any amount. However, the silicone is preferably included in an amount of from 0.5 to 5, more preferably in an amount of from 0.5 to 4, and most preferably of from 1 to 3, parts by weight per 100 parts by weight of the resin composition.

The resin composition may also include the amine as the additive. Without intending to be limited by any particular theory, it is believed that if the resin composition includes the amine as the additive, the amine functions as a blowing catalyst that catalyzes the reaction of the blowing agent and the isocyanate component. Preferably, the amine includes amine catalysts such as Niax amine catalysts. Most preferably, the amine includes DABCO BL-11 or Niax A1 amine catalysts, each of which includes 2,2-oxybis(N,N-dimethylethylamine). If included in the resin composition, the amine may be present in any amount. However, the amine is preferably included in an amount of from 0.01 to 1 and more preferably of from 0.05 to 0.5, parts by weight per 100 parts by weight of the resin composition.

The resin composition may also include the surfactant as the additive. The surfactant may be used with the bulk and surface silicone surfactants, with any of the aforementioned additives, or alone. Any surfactant known in the art may be used in the present invention. As such, the surfactant may include non-ionic surfactants, cationic surfactants, anionic surfactants, amphoteric surfactants, and combinations thereof. If the surfactant is included in the resin composition, the second surfactant preferably includes, but is not limited to, polyoxyalkylene polyol surfactants, alkylphenol ethoxylate surfactants, and combinations thereof. More preferably, the surfactant includes, but is not limited to, commercial surfactants including Pluronic® polyethers and Tetronic® polyethers commercially available from the BASF Corporation of Wyandotte, Mich. If the surfactant is included in the resin composition, the surfactant may be present in any amount. However, the surfactant is preferably included in an amount of from 0.01 to 5 and more preferably of from 0.5 to 2, parts by weight per 100 parts by weight of the resin composition.

The resin composition may also include the cross-linker as the additive. The cross-linker may include, but is not limited to, a second polyol, amines, and combinations thereof. It is contemplated that the second polyol and/or the amine may be any known in the art. If the cross-linker includes the second polyol, the second polyol preferably has a hydroxyl number of greater than 20 mg KOH/g and a functionality of greater than 2. Also, if the cross-linker includes the amine, the amine preferably includes diethanolamine, triethanolamine, ethylene diamine alkoxylation products having hydroxyl numbers greater than 20 mg KOH/g, and combinations thereof. If the cross-linker is included in the resin composition, the cross-linker may be present in any amount. However, the cross-linker is preferably included in an amount of from 0.01 to 5 and more preferably of from 0.5 to 2, parts by weight per 100 parts by weight of the resin composition.

If the resin composition includes the chain extender as the additive, the chain extender preferably has a number average molecular weight of less than about 400 g/mol. However, chain extenders with number average molecular weights of greater than 400 g/mol are also contemplated for use. Chain extenders contemplated for use in the present invention include, but not limited to, hydrazine, primary and secondary diamines, alcohols, amino acids, hydroxy acids, glycols, and combinations thereof. Specific chain extenders that are contemplated for use include, but are not limited to, mono and di-ethylene glycols, mono and di-propylene glycols, 1,4-butane diol, 1,3-butane diol, propylene glycol, dipropylene glycol, diethylene glycol, methyl propylene diol, mono, di and tri-ethanolamines, N—N'-bis-(2 hydroxy-propylaniline), trimethylolpropane, glycerine, hydroquinone bis(2-hydroxyethyl) ether, 4,4'-methylene-bis(2-chloroaniline, diethyltoluenediamine, 3,5-dimethylthio-toluenediaamine, hydrazine, isophorone diamine, adipic acid, silanes, and combinations thereof. Most preferably, the chain extender is selected from the group of 1,4-butanediol, 1,3-butanediol, ethylene glycol and combinations thereof. 1,3-butanediol is commercially available from GE Silicones of Wilton, Conn., under the trade name of NIAX Processing Additive DP-1022. If included in the resin composition, the chain-extender may be present in any amount. However, the chain-extender is preferably included in an amount of from 1 to 15 and more preferably in an amount of from 3 to 15, parts by weight per 100 parts by weight of the resin composition.

If the resin composition includes the anti-foaming agent as the additive, the anti-foaming agent preferably includes a silicone liquid commercially available from Dow Corning of Midland, Mich., under the trade name of Antifoam-A. The silicone liquid is preferably different from the bulk and surface silicone surfactants and may be used in combinations with the bulk and surface silicone surfactants or may be used alone. The anti-foaming agent typically acts to break an interface of gas bubbles formed from a reaction of water and/or humidity and the isocyanate component. If included in the resin composition, the anti-foaming agent may be present in any amount. However, the anti-foaming agent is preferably included in an amount of from 1 to 15 parts by weight per 100 parts by weight of the resin composition.

If the resin composition includes the chain terminator as the additive, the chain terminator preferably includes an alcohol. More preferably, the chain terminator includes a primary alcohol. Most preferably, the chain terminator includes a blend of $C_{12}$, $C_{13}$, $C_{14}$ and $C_{15}$ high purity primary alcohols commercially available from Shell Chemicals of Houston, Tex., under the trade name of Neodol® 25. If included in the resin composition, the chain terminator may be present in any amount. However, the chain terminator is preferably included in an amount of from 1 to 15 parts by weight per 100 parts by weight of the resin composition.

The resin composition may also include the inert diluent as the additive. Preferably, the inert diluent includes, but is not limited to, plasticizers. It is contemplated that any inert diluent known in the art may be used in the present invention. However, examples of suitable inert diluents include, but are not limited to, 2,2,4-trimethyl-1,3-pentane diisobutyrate, acetone, diisonyl phthalate, and combinations thereof. If included, the inert diluent may be included in any amount. However, it is preferred that the inert diluent is present in an amount of from 0.01 to 30 parts by weight per 100 parts by weight of the resin composition.

Other suitable additives may also be utilized in the present invention. These suitable additives include, but are not limited to, air releasing agents, wetting agents, surface modifiers, waxes, inert inorganic fillers, molecular sieves, reactive inorganic fillers, chopped glass, other types of glass such as glass mat, processing additives, surface-active agents, adhesion promoters, anti-oxidants, dyes, pigments, ultraviolet light stabilizers, thixotropic agents, anti-aging agents, lubricants, adhesion promoters, coupling agents, solvents, rheology promoters, and combinations thereof.

The present invention also provides an article. The article includes the reaction product of the resin composition, including the compound having at least two reactive hydrogen atoms, and an isocyanate, wherein the resin composition and the isocyanate are reacted in the presence of the polyurethane encapsulated particle. The isocyanate may be the same as the isocyanate component described above, or may be different. Preferably, the resin composition and the isocyanate are reacted at an isocyanate index of from 80 to 130, more preferably of from 90 to 120, and most preferably of from 95 to 110. The resin composition and the isocyanate are reacted in the presence of the polyurethane encapsulated particle including the core particle and the polyurethane layer disposed about the core particle. It is contemplated that the polyurethane encapsulated particle may be present in the resin composition, in the isocyanate, or in both the resin composition and the isocyanate. Preferably, the article has a density of from 1 to 5, and more preferably of from 1 to 4, lbs per cubic foot.

If the compound includes the polyol, the article formed may include a polyurethane foam or a polyurethane elastomer. Most preferably, the article includes the polyurethane foam. Conversely, if the compound includes the amine or the amide, the article formed may include a polyurea foam or a polyurea elastomer. The article of the present invention can be used in a wide variety of applications including, but not limited to, as furniture and mattress cushioning, in automobile seat and automobile trim applications such as head and arm rests, as insulation and as a strengthening material, in instrument panels and door bolsters, as coatings, adhesives, sealants, and in reaction injection molded plastics. Most preferably, the article is used as furniture and mattress cushioning.

The present invention also provides a method of making the article. The method includes the step of providing the core particle in a vessel. The vessel may be any vessel known in the art suitable for mixing. However, the vessel preferably includes, but is not limited to, a reaction container and mechanical mixer.

The method also includes the step of introducing the polyol component. Preferably, the polyol component is introduced into the vessel. However, the polyol component may also be introduced above the vessel. The method further includes the step of introducing the isocyanate component. Like the polyol component, the isocyanate component is preferably introduced into the vessel. However, the isocyanate component, like the polyol component, may also be introduced above the vessel through various methods such as spraying. It is contemplated that the step of introducing the polyol component may include the step of introducing the polyol component before introducing the isocyanate component. Conversely, it is also contemplated that the step of introducing the isocyanate component may include the step of introducing the isocyanate component before introducing the polyol component. It is further contemplated that the steps of introducing the polyol component and introducing the isocyanate component may be repeated.

The method further includes the step of combining the polyol component and the isocyanate component to encapsulate the core particle. Preferably, the polyol component and the isocyanate component are combined for a time of from 0.1 to 10 seconds at ambient temperature of 15 to 30° C. Preferably, the polyol component and the isocyanate component are combined in a ratio of 1:1.10, more preferably of 1:1.05, and most preferably in a ratio of 1:03, parts of the polyol component to parts of the isocyanate component.

The polyol component and the isocyanate component may be combined using a variety of techniques including, but not limited to, pouring, pan coating, fluidized-bed coating, co-extrusion, mixing, spraying and spinning disk encapsulation. Most preferably, the polyol component and the isocyanate component are combined by spraying both either into or above the vessel. Specifically, mixing, and most preferably spraying, the polyol component and the isocyanate component to encapsulate the core particle preferably encapsulates the core particle in a uniform and defect-free polyurethane layer disposed about the core particle. It is contemplated that the core particle may be encapsulated one time with a single polyurethane layer or multiple times with multiple polyurethane layers. Preferably, the polyurethane layer is disposed about at least 75, more preferably about at least 95, and most preferably about at least 99, percent of the core particle. Spraying preferably results in a thinner and less expensive polyurethane layer disposed about the core particle.

Preferably, after the polyol component and the isocyanate component are combined to encapsulate the core particle, the method includes the step of heating and/or agitating the polyurethane encapsulated particle to reduce agglomeration. The polyurethane encapsulated particle may be heated and/or agitated in the vessel or in any container. Preferably, the polyurethane encapsulated particle is heated in a jacketed system and agitated in mechanical mixer including, but not limited to, a ribbon blender, a plough blender, a processing mixer, and combinations thereof.

If heated, the polyurethane encapsulated particle is preferably heated at a temperature of from 60 to 80° C. Also, the polyurethane encapsulated particle is preferably heated for a time of from 5 to 120, more preferably of from 5 to 90, and most preferably of from 5 to 60, minutes.

The step of agitating the polyurethane encapsulated core particle may include, but is not limited to, stirring, mixing, shaking, and combinations thereof. If agitated, the polyurethane encapsulated particle is preferably agitated for a time of from 5 to 120, more preferably of from 5 to 90, and most preferably of from 5 to 60, minutes.

The method still further includes the step of combining the isocyanate and the resin composition, including the compound described above having at least two reactive hydrogen atoms, in the presence of the polyurethane encapsulated particle, to form the article. It is contemplated that the isocyanate may be the same or may be different from isocyanate component.

The method may also include the step of incorporating the encapsulated particle into the resin composition prior to combining the isocyanate and the resin composition. The method may alternatively include the step of incorporating the encapsulated particle into the isocyanate prior to combining the isocyanate component and the resin composition.

EXAMPLES

Two groups of encapsulated particles, Particles 1 and Particles 2, are formed according to the present invention. A series of polyurethane foams, Foams 1 through 6, are also formed. Foams 1 through 6 are formed using the resin composition and the isocyanate of the present invention. The Foams 1 through 3 includes Particles 1. The Foams 4 through 6 include Particles 2. Further, a series of comparative polyurethane foams, Comparative Foams 1 through 3, are also formed. The Comparative Foams 1 through 3 do not include either the Particles 1 or the Particles 2 and therefore serve as controls.

It is believed that addition of the Particles 1 and 2 to the Foams 1 through 3 and the Foams 4 through 6, respectively, increase the flame retardancy of the Foams 1 through 6. If the addition of the Particles 1 and 2 increase the flame retardancy, then the after flame time, heat-aged after flame time, char length, and heat-aged char length, of each of the Foams 1 through 6, are minimized or equalized with the Comparative Foams 1 through 3 and evidenced in Table 1 below.

Specifically, to form Particles 1, 1040 grams of ground urea are added to a reactor and heated to a temperature between 165 and 170° F. Over 10 minutes, 118 grams of Polyol Component are added. Upon addition, the Polyol Component and the ground urea are mixed for 30 minutes. After mixing, 89.9 grams of Isocyanate Component are added to the Polyol Component and the ground urea over 10 minutes. Upon addition, the Isocyanate Component, the Polyol Component, and the ground urea are mixed for one hour to allow the Polyol Component and the Isocyanate Component to react and encapsulate the ground urea. Particles 2 are formed in the same manner as Particles 1 including the same amount of the urea, Polyol Component, and Isocyanate Component. The Polyol Component and the Isocyanate Component used to form Particles 2 are the same as those used to form Particles 1. However, the urea used to form Particles 2 is spheroidized as opposed to the ground urea used to form Particles 1.

Both the Foams 1 through 6 and Comparative Foams 1 through 3 are independently formed from a series of mechanically mixed compositions, Compositions 1 through 6 and Comparative Compositions 1 through 3, respectively. Each of the Compositions 1 through 6 and the Comparative Compositions 1 through 3 include 100.0 parts by weight of a Polyol and varying amounts of Water, Silicone Additive, Amine Additive A, Amine Additive B, and the Supplemental Flame Retardant Additives A and B, as set forth in Table 1. For the Foams 1 through 3, varying amounts of the Particles 1 are added to the Compositions 1 through 3. For the Foams 4 through 6, varying amounts of the Particles 2 are added to the Compositions 4 through 6. For the Comparative Foams 1 through 3, neither the Particles 1 nor the Particles 2 are added.

After adding the Particles 1 to the Compositions 1 through 3 and adding the Particles 2 to the Compositions 4 through 6, each of the Compositions 1 through 6 and the Comparative Compositions 1 through 3 are mixed for 15 seconds with a 2.5 inch German mix blade at 1200 rpm. After mixing, water is added in varying amounts to each of the Compositions 1 through 6 and the Comparative Compositions 1 through 3 while mixing for 8 seconds. After mixing for 8 seconds, varying amounts of the isocyanate are added to each of the Compositions 1 through 6 and the Comparative Compositions 1 through 3 such that the isocyanate indices are 110, as further set forth in Table 1. After the varying amounts of the isocyanate are added, the Compositions 1 through 6 and the Comparative Compositions 1 through 3 are again mixed for an additional 8 seconds, then poured into containers which are allowed to rest overnight at a room temperature of approximately 22° C. After resting overnight, the Compositions 1 through 6 and the Comparative Compositions 1 through 3 are post cured at approximately 121° C. for 60 minutes to form the Foams 1 through 6, and the Comparative Foams 1 through 3, respectively.

After curing, five samples of each of the Foams 1 through 6, and the Comparative Foams 1 through 3 are evaluated for after flame time, heat-aged after flame time, char length, and heat-aged char length, and the averages are set forth in Table 1. All components are in parts by weight unless otherwise noted.

TABLE 1

| | Component | Foam 1 | Foam 2 | Foam 3 |
|---|---|---|---|---|
| Compositions | Polyol | 100 | 100 | 100 |
| | Water | 3.5 | 4.5 | 5.5 |
| | Silicone Additive | 1.5 | 2 | 2.5 |
| | Amine Additive A | 0.12 | 0.12 | 0.12 |
| | Amine Additive B | 0.03 | 0.03 | 0.03 |
| | Polymerization Catalyst | 0.4 | 0.5 | 0.6 |
| | Supplemental Flame Retardant Additive | 6.6 | 11.58 | 16 |
| | Polyurethane Encapsulated Urea | 19.79 | 26.06 | 35.19 |
| | Total | 131.94 | 144.79 | 159.94 |
| Isocyanate | Isocyanate (g) per total parts by weight of the resin composition | 46.94 | 57.59 | 68.23 |
| | NCO % | 48.25 | 48.25 | 48.25 |
| | Weight Ratio | 0.356 | 0.398 | 0.427 |
| | Isocyanate Index | 110 | 110 | 110 |
| | Total | 100.00 | 100.00 | 100.00 |
| California Technical Bulletin 117* | Average After Flame Time (sec) | 0.3 | 0.6 | 0.0 |
| | Average Char Length (in) | 1.8 | 1.9 | 1.7 |
| | Average Heat-Aged After Flame Time (sec) | 2.8 | 1.2 | 1.5 |
| | Average Heat-Aged Char Length (in) | 2.9 | 2.8 | 3.7 |

| | Component | Foam 4 | Foam 5 | Foam 6 |
|---|---|---|---|---|
| Compositions | Polyol | 100 | 100 | 100 |
| | Water | 3.5 | 5.5 | 4.5 |
| | Silicone Additive | 1.5 | 2.5 | 2.3 |
| | Amine Additive A | 0.12 | 0.12 | 0.12 |
| | Amine Additive B | 0.03 | 0.03 | 0.03 |
| | Polymerization Catalyst | 0.4 | 0.6 | 0.7 |
| | Supplemental Flame Retardant Additive | 6.6 | 16 | 0.0 |
| | Polyurethane Encapsulated Urea | 19.79 | 35.19 | 46.13 |
| | Total | 131.94 | 159.94 | 153.78 |
| Isocyanate | Isocyanate (g) per total parts by weight of the resin composition | 46.94 | 68.23 | 57.59 |
| | NCO % | 48.25 | 48.25 | 48.25 |
| | Weight Ratio | 0.356 | 0.427 | 0.374 |
| | Isocyanate Index | 110 | 110 | 110 |
| | Total | 100.00 | 100.00 | 100.00 |
| California Technical Bulletin 117* | Average After Flame Time (sec) | 0.9 | 1.6 | 1.8 |
| | Average Char Length (in) | 2.2 | 2.9 | 2.8 |
| | Average Heat-Aged After Flame Time (sec) | 0.8 | 0.3 | 4.8 |
| | Average Heat-Aged Char Length (in) | 2.6 | 2.6 | 4.1 |

| | Component | Comp. Foam 1 | Comp. Foam 2 | Comp. Foam 3 |
|---|---|---|---|---|
| Compositions | Polyol | 100 | 100 | 100 |
| | Water | 3.5 | 4.5 | 5.5 |
| | Silicone Additive | 1 | 1.5 | 2 |
| | Amine Additive A | 0.12 | 0.12 | 0.12 |
| | Amine Additive B | 0.03 | 0.03 | 0.03 |
| | Polymerization Catalyst | 0.3 | 0.4 | 0.5 |
| | Supplemental Flame Retardant Additive | 18.52 | 2.5 | 32.30 |
| | Polyurethane Encapsulated Urea | 0.0 | 0.0 | 0.0 |
| | Total | 123.47 | 131.55 | 140.45 |
| Isocyanate | Isocyanate (g) per total parts by weight of the resin composition | 46.94 | 57.59 | 68.23 |
| | NCO % | 48.25 | 48.25 | 48.25 |
| | Weight Ratio | 0.380 | 0.438 | 0.486 |
| | Isocyanate Index | 110 | 110 | 110 |
| | Total | 100.00 | 100.00 | 100.00 |
| California Technical Bulletin 117* | Average After Flame Time (sec) | 1.8 | 0.0 | 0.0 |
| | Average Char Length (in) | 5.3 | 5.3 | 5.3 |
| | Average Heat-Aged After Flame Time (sec) | 1.3 | 0.0 | 0.0 |
| | Average Heat-Aged Char Length (in) | 5.5 | 5.7 | 5.2 |

*This numerical flame spread rating, as in other tests of flammability, is not intended to reflect hazards presented by this or any other material under actual fire conditions.

The Polyol, commercially available from BASF Corporation of Wyandotte, Mich., under the trade name of Pluracol® 1388, includes a hydroxyl number of 56 mg KOH/g, a nominal functionality of 3, and a number average molecular weight of 3000 g/mol.

The Silicone Additive is commercially available from GE Silicones of Wilton, Conn., under the trade name of NIAX L-620.

The Amine Additive A is commercially available from Air Products and Chemicals, Inc. of Allentown, Pa. under the trade name of DABCO 33 LV.

The Amine Additive B is commercially available from Air Products and Chemicals, Inc. of Allentown, Pa. under the trade name of DABCO BL-11.

The Polymerization Catalyst, commercially available from Air Products and Chemicals, Inc. of Allentown, Pa. under the trade name of DABCO T10.

The Supplemental Flame Retardant Additive, commercially available from Great Lakes Chemical Corporation of Indianapolis, Ind., under the trade name of Firemaster® 550, includes phosphorous and bromine.

The Polyurethane Encapsulated Urea is the polyurethane encapsulated core particle of the present invention. The urea, as the core particle, is commercially available from Agrium, Inc. of Calgary, Alberta, Canada, under the trade name of Urea 46-0-0.

The Isocyanate, commercially available from BASF Corporation of Wyandotte, Mich., under the trade name of Lupranate® MP102, is a liquid modified pure diphenylmethane diisocyanate including an NCO content of approximately 23% by weight, and a nominal functionality of 2.

The Isocyanate Index for the present invention is defined as 100 times the ratio of the number of isocyanate (NCO) groups in the isocyanate to the number of hydroxyl (OH) groups in the resin composition.

After Flame Time is defined as a length of time for which an after flame persists in a combustible material under specified conditions. The after flame times for the present invention were determined by California Technical Bulletin 117. The maximum allowable after flame time for a material such that the material is compliant with California Technical Bulletin 117 is 10 seconds with an average of 5 seconds.

Heat-Aged After Flame Time is defined as a length of time for which an after flame persists in a combustible material under specified conditions after the material has been aged in a furnace for a specified time period. The heat-aged after flame times for the present invention were determined by California Technical Bulletin 117 after the five samples of each of the Foams 1 through 16, and the Comparative Foams 1 through 4 were aged in the furnace at 104° C. for 24 hours. The maximum allowable heat-aged after flame time for a material such that the material is compliant with California Technical Bulletin 117 is 10 seconds with an average of 5 seconds.

Char Length is defined as a length of carbonaceous residue resulting from pyrolysis or incomplete combustion of a material. The char lengths for the present invention were determined by California Technical Bulletin 117. The maximum allowable char length for a material such that the material is compliant with California Technical Bulletin 117 is 8 inches with an average of 6 inches.

Heat-Aged Char Length is defined as a length of carbonaceous residue resulting from pyrolysis or incomplete combustion of a material after the material has been aged in a furnace for a specified time period. The heat-aged char lengths for the present invention were determined by California Technical Bulletin 117 after the five samples of each of the Foams 1 through 6, and the Comparative Foams 1 through 3 were aged in the furnace at 104° C. for 24 hours. The maximum allowable heat-aged char length for a material such that the material is compliant with California Technical Bulletin 117 is 8 inches with an average of 6 inches.

As shown in Table 1, the average After Flame Times, average Char Lengths, average Heat-Aged After Flame Times, and average Heat-Aged Char Lengths of the Foams 1 through 6 are all compliant with the California Technical Bulletin 117.

The invention has been described in an illustrative manner, and it is to be understood that the terminology which has been used is intended to be in the nature of words of description rather than of limitation. Obviously, many modifications and variations of the present invention are possible in light of the above teachings, and the invention may be practiced otherwise than as specifically described.

What is claimed is:

1. A resin composition comprising:
   A. a compound having at least two reactive hydrogen atoms; and
   B. a polyurethane encapsulated particle comprising;
      (i) a core particle comprising a flame retardant which has a temperature of decomposition of from 50 to 600° C. for increasing flame resistance of said resin composition and having a diameter of from about 163 to 500 microns; and
      (ii) a polyurethane layer disposed about said core particle,
wherein said polyurethane layer is substantially impermeable to water.

2. A resin composition as set forth in claim 1 wherein said compound is present in said resin composition in an amount of from 50 to 95 parts by weight per 100 parts by weight of said resin composition and said polyurethane encapsulated particle is present in said resin composition in an amount of from 5 to 50 parts by weight per 100 parts by weight of said resin composition.

3. A resin composition as set forth in claim 1 wherein said core particle comprises the general structure:

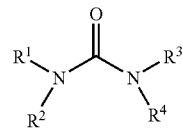

wherein each of $R^1$ through $R^4$ independently comprises one of an aliphatic group, an aromatic group, and a hydrogen.

4. A resin composition as set forth in claim 3 wherein said core particle further comprises the general structure:

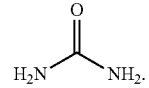

5. A resin composition as set forth in claim 1 wherein said core particle has a diameter of from about 163 to 300 microns.

6. A resin composition as set forth in claim 1 wherein said core particle has a temperature of decomposition of from 70 to 400° C.

7. A resin composition as set forth in claim 1 wherein said polyurethane layer has a temperature of decomposition of from 150 to 350° C.

8. A resin composition as set forth in claim 1 wherein said compound is selected from the group of a polyol, an amine, and combinations thereof.

9. A resin composition as set forth in claim 8 wherein said polyol is selected from the group of polyether polyols, polyester polyols, polycarbonate polyols, and combinations thereof.

10. A resin composition as set forth in claim 8 wherein said polyol comprises an addition polymer dispersed within said polyol.

11. A resin composition as set forth in claim 1 wherein said polyurethane layer disposed about said core particle comprises the reaction product of an isocyanate component and a polyol component.

12. A resin composition as set forth in claim 11 wherein said polyol component comprises polytetrahydrofuran.

13. A resin composition as set forth in claim 11 wherein said polyol component is derived from an aromatic amine-based initiator comprising the general structure:

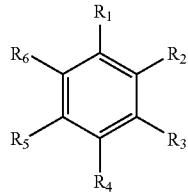

wherein $R_1$ comprises one of an alkyl group, an amine group, and a hydrogen; and wherein each of $R_2$-$R_6$ independently comprise one of an amine group and a hydrogen; so long as at least one of $R_1$-$R_6$ is an amine group.

14. A resin composition as set forth in claim 13 wherein said aromatic amine-based initiator comprises a toluene diamine.

15. A resin composition as set forth in claim 1 further comprising a supplemental flame retardant additive selected from the group of phosphorous, halogens, and combinations thereof.

16. A resin composition as set forth in claim 1 further comprising an additive selected from the group of silicones, amines, polymerization catalysts, gelling catalysts, blowing agents, surfactants, cross-linkers, inert diluents, chain extenders, anti-foaming agents, chain terminators, and combinations thereof.

17. A resin composition as set forth in claim 1 wherein said compound is a polyether polyol having a hydroxyl number of from 20 to 40 and a nominal functionality of 3, said core particle comprises the general structure:

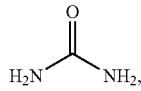

and said resin composition further comprises a supplemental flame retardant additive selected from the group of phosphorous, bromine, and combinations thereof.

18. An article comprising the reaction product of:
A. a resin composition comprising a compound having at least two reactive hydrogen atoms; and
B. an isocyanate;
wherein said resin composition and said isocyanate are reacted in the presence of a polyurethane encapsulated particle comprising;
(i) a core particle comprising a flame retardant which has a temperature of decomposition of from 50 to 600° C. for increasing flame resistance of said article and having a diameter of from about 163 to 500 microns; and
(ii) a polyurethane layer disposed about said core particle,
wherein said polyurethane layer is substantially impermeable to water.

19. An article as set forth in claim 18 wherein said core particle comprises the general structure:

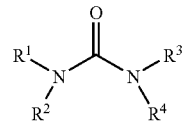

wherein each of $R^1$ through $R^4$ independently comprises one of an aliphatic group, an aromatic group, and a hydrogen.

20. An article as set forth in claim 18 wherein said compound is present in the resin composition in an amount of from 50 to 95 parts by weight per 100 parts by weight of said resin composition.

21. An article as set forth in claim 18 wherein said compound is selected from the group of a polyol, an amine, and combinations thereof.

22. An article as set forth in claim 21 wherein said polyol is selected from the group of polyether polyols, polyester polyols, polycarbonate polyols, and combinations thereof.

23. An article as set forth in claim 18 wherein said polyurethane encapsulated particle is present in said resin composition in an amount of from 5 to 50 parts by weight per 100 parts by weight of said resin composition.

24. An article as set forth in claim 18 wherein said polyurethane layer disposed about said core particle comprises the reaction product of an isocyanate component and a polyol component.

25. An article as set forth in claim 24 wherein said polyol component comprises polytetrahydrofuran.

26. An article as set forth in claim 24 wherein said polyol component is derived from an aromatic amine-based initiator.

27. An article as set forth in claim 18 wherein said isocyanate comprises an aromatic isocyanate.

28. An article as set forth in claim 27 wherein said aromatic isocyanate is selected from the group of methylene diphenyl diisocyanate, toluene diisocyanate, and combinations thereof.

29. An article as set forth in claim 18 wherein said compound is a polyether polyol having a hydroxyl number of from 20 to 40 and a nominal functionality of 3, said isocyanate is selected from the group of methylene diphenyl diisocyanate, toluene diisocyanate, and combinations thereof, said core particle comprises the general structure:

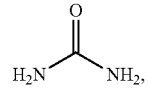

and said resin composition further comprises a supplemental flame retardant additive selected from the group of phosphorous, bromine, and combinations thereof.

30. A method of making an article comprising the steps of:
providing a core particle in a vessel wherein the core particle comprises a flame retardant which has a temperature of decomposition of from 50 to 600° C. for increasing flame resistance of the article and wherein the core particle has a diameter of from about 163 to 500 microns;

introducing a polyol component and an isocyanate component into the vessel in the presence of the core particle to encapsulate the core particle with a polyurethane layer;

combining an isocyanate and a resin composition comprising a compound having at least two reactive hydrogen atoms in the presence of the encapsulated particle to form the article, wherein the polyurethane layer is substantially impermeable to water.

31. A method as set forth in claim 30 wherein the polyol component is introduced into the vessel before the isocyanate component.

32. A method as set forth in claim 30 wherein the polyol component is introduced into the vessel after the isocyanate component.

33. A method as set forth in claim 30 further comprising the step of incorporating the encapsulated particle into the resin composition prior to combining the isocyanate and the resin composition.

34. A method as set forth in claim 30 further comprising the step of incorporating the encapsulated particle into the isocyanate prior to combining the isocyanate and the resin composition.

35. A method as set forth in claim 30 further comprising the step of heating the encapsulated particle.

36. A method as set forth in claim 30 wherein the compound is selected from the group of polyether polyols, polyester polyols, polycarbonate polyols, and combinations thereof.

37. A method as set forth in claim 30 wherein the polyol component comprises polytetrahydrofuran.

38. A method as set forth in claim 30 wherein the core particle comprises the general structure:

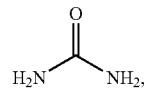

the polyol component comprises polytetrahydrofuran, the isocyanate component is selected from the group of methylene diphenyl diisocyanate, toluene diisocyanate, and combinations thereof, the compound comprises a polyether polyol having a hydroxyl number of from 30 to 40 and a nominal functionality of 3, and the resin composition further comprises a flame retardant additive selected from the group of phosphorous, bromine, and combinations thereof.

\* \* \* \* \*